United States Patent
Chandolu et al.

(10) Patent No.: US 9,766,834 B2
(45) Date of Patent: *Sep. 19, 2017

(54) LIVE PARTITION MOBILITY USING ORDERED MEMORY MIGRATION

(71) Applicant: International Business Machines Corporation, Armonk, NY (US)

(72) Inventors: Uma Maheswara R. Chandolu, Hyderabad (IN); Chetan L. Gaonkar, Kumta (IN); Keerthi B. Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,542

(22) Filed: Sep. 24, 2015

(65) Prior Publication Data

US 2017/0010837 A1    Jan. 12, 2017

Related U.S. Application Data

(63) Continuation of application No. 14/795,898, filed on Jul. 10, 2015.

(51) Int. Cl.
    *G06F 12/00*      (2006.01)
    *G06F 3/06*      (2006.01)
    (Continued)

(52) U.S. Cl.
    CPC .......... *G06F 3/0647* (2013.01); *G06F 3/0604* (2013.01); *G06F 3/067* (2013.01);
    (Continued)

(58) Field of Classification Search
    CPC .... G06F 3/0604; G06F 3/0617; G06F 3/0632; G06F 3/0647; G06F 3/067; G06F 3/0673; G06F 9/4856
    See application file for complete search history.

(56) References Cited

U.S. PATENT DOCUMENTS

| | | |
|---|---|---|
| 8,239,609 B2 | 8/2012 | Hudzia et al. |
| 2009/0063749 A1 | 3/2009 | Dow |

(Continued)

OTHER PUBLICATIONS

Chandolu et al., "Live Partition Mobility Using Ordered Memory Migration", U.S. Appl. No. 14/795,898, filed Jul. 10, 2015, pp. 1-41.

(Continued)

*Primary Examiner* — Yong Choe
(74) *Attorney, Agent, or Firm* — James H. Mayfield

(57) ABSTRACT

As disclosed herein a method, executed by a computer, for enabling live partition mobility using ordered memory migration includes receiving a request to initialize a migration of a logical partition (LPAR) to a destination system. The method further includes creating a list which includes memory page identifiers corresponding to memory pages of the LPAR. The memory page identifiers of the list are ordered according to a page transfer priority. The method further includes identifying memory pages of the LPAR that will be unmodified during an estimated duration of time of the migration. The method further includes updating the list, based on the identified memory pages of the LPAR that will be unmodified during the estimated duration of time of the migration. The method further includes migrating the LPAR based on the list. A computer system, and a computer program product corresponding to the method are also disclosed herein.

7 Claims, 6 Drawing Sheets

(51) Int. Cl.
*H04L 12/24* (2006.01)
*G06F 9/48* (2006.01)

(52) U.S. Cl.
CPC .......... *G06F 3/0617* (2013.01); *G06F 3/0632* (2013.01); *G06F 3/0673* (2013.01); *H04L 41/12* (2013.01); *H04L 41/24* (2013.01); *G06F 9/4856* (2013.01); *H04L 41/0816* (2013.01)

(56) References Cited

U.S. PATENT DOCUMENTS

| | | |
|---|---|---|
| 2010/0205252 A1 | 8/2010 | Dorai et al. |
| 2012/0011504 A1 | 1/2012 | Ahmad et al. |
| 2014/0068207 A1 | 3/2014 | Aslot et al. |

OTHER PUBLICATIONS

IBM Appendix P, list of IBM Patents and Patent Applications treated as related, Sep. 24, 2015, 2 pages.

LIVE PARTITION MOBILITY USING ORDERED MEMORY MIGRATION

BACKGROUND

The present invention relates generally to system migration, and more particularly to system migration via live partition mobility using ordered memory migration.

A data center is a facility used to house computer systems and associated components crucial to a company's vitality. Information technology (IT) operations within a data center are a crucial aspect of many organizational operations within an industry. A company may operate its own data center, or optionally the company may receive its IT services as a cloud computing service. Companies rely on their IT operations to run their day-to-day business activities, with a primary concern being maintaining business continuity. If a computer system or application becomes unavailable, company operations may be impaired or stopped completely. It is necessary to provide reliable infrastructure for IT operations, in order to minimize any chance of service disruption. A data center must therefore keep high standards for assuring the integrity and functionality of its hosted computer environment.

The capacity of physical servers located in a data center is increasing, resulting in the number of virtual machines, also known as logical partitions or LPARs, defined on a physical server to also increase. An LPAR is the division of a computer's processors, memory, and storage into multiple sets of resources so that each set of resources can be operated independently with its own operating system instance and applications. Situations may arise (e.g., server maintenance) that require a physical server to be shut down, meaning that all LPARs on the physical server will have to be shut down as well. To avoid disruption, live partition mobility (LPM) may be used to migrate a running LPAR from one managed system to another. LPM allows for the movement (i.e., migration) of an active (i.e., running) LPAR from one system to another with no application downtime.

SUMMARY

As disclosed herein a method, executed by a computer, for enabling live partition mobility using ordered memory migration includes receiving a request to initialize a migration of a logical partition (LPAR) to a destination system. The method further includes creating, by one or more processors, a list, wherein the list includes one or more memory page identifiers corresponding to memory pages of the LPAR, wherein the one or more memory page identifiers of the list are ordered according to a page transfer priority. The method further includes identifying, by one or more processors, memory pages of the LPAR that will be unmodified during an estimated duration of time of the migration. The method further includes updating, by one or more processors, the list, based on, at least, the identified memory pages of the LPAR that will be unmodified during the estimated duration of time of the migration. The method further includes migrating, by one or more processors, the LPAR based on, at least, the list. A computer system, and a computer program product corresponding to the method are also disclosed herein.

DETAILED DESCRIPTION

A data center may include many physical servers that are divided into one or more logical partitions (LPARs) or virtual machines, with each LPAR capable of providing a unique service. Services provided by an LPAR may include, but are not limited to, an AIX® server, a LINUX® server, or a virtual I/O server. It may be determined that an LPAR must be moved (i.e., migrated) to a different physical server without causing an interruption of the service provided by the LPAR. The migration of the LPAR from a source server to an LPAR in a destination system may be performed using live partition mobility (LPM) technology. LPM allows for the migration of an active (e.g., running), suspended, or inactive (e.g., not activated) partition from one system to another with no application downtime.

LPM migration may comprise two phases, a pre-migration phase and an on-demand migration phase. In the pre-migration phase, memory pages corresponding to an LPAR are copied asynchronously from a source system to an LPAR on a destination, with dirty memory pages being re-copied as necessary. Dirty memory pages are pages of memory whose contents on the source system may have changed after the page was copied to the destination system. The on-demand phase begins when a predefined percentage of the memory pages have been successfully copied to the destination. Any remaining uncopied pages are copied to the destination system synchronously (i.e., on-demand).

Embodiments of the present invention recognize that during the LPM pre-migration phase many pages are unnecessarily copied to the destination system. For example, pages that will become dirty need not be copied, pages that will be freed on the source system prior to the LPM migration completing need not be copied, pages that will be paged out prior to the LPM migration completing need not be copied, and pages corresponding to the LPM processes performing the migration need not be copied. However, migration processes unnecessarily transfer pages meeting the aforementioned scenarios. These issues, among others, cause additional consumption of system resources which may delay the completion of the LPM migration operation and may cause the LPM migration operation to time out. The embodiments disclosed herein generally address and solve the above-described problems.

Figure 1:
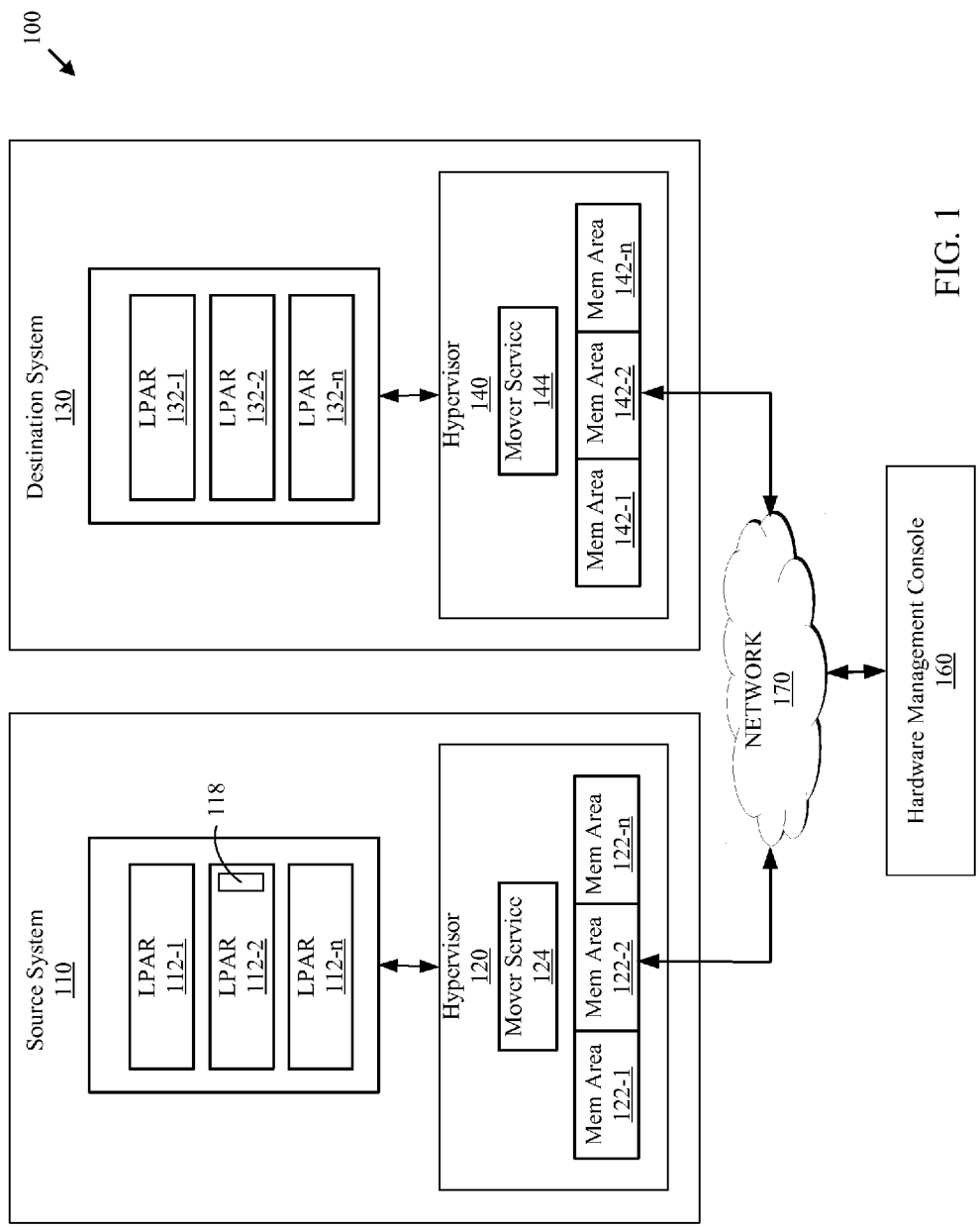
FIG. 1 is a block diagram depicting one embodiment of a virtualized computing environment in which at least some of the embodiments disclosed herein may be deployed.

FIG. 1 shows an example of virtualized computing environment 100 applicable to various embodiments of the present invention. Virtualized computing environment 100 includes a plurality of managed systems, such as source system 110 and destination system 130. Also included in virtualized computing environment 100 is hardware management console (HMC) 160 that may be used to manage (e.g., configure and operate) one or more LPARs (e.g., 112-1 to 112-*n* and 132-1 to 132-*n*) on managed systems 110 and 130. Additionally, LPAR 112-2 includes migration process 118. Migration process 118 may be a process within LPAR 112-2 that is migrating LPAR 112-2 to another managed system (e.g., destination system 130). In the depicted example, migration process 118 is coordinating the migration of LPAR 112-2 and corresponding memory area 122-2 to LPAR 132-2 and memory area 142-2 on destination system 130.

Each of managed systems 110 and 130 and HMC 160 are connected to network 170. Network 170 can be a local area network (LAN), a wide area network (WAN) such as the Internet, or a combination of the two, and can include wired, wireless, or fiber optic connections. In general, network 170 can be any combination of connections and protocols that will support communications between source system 110, destination system 130, and HMC 160, in accordance with embodiments of the invention. Virtualized computing environment 100 may include additional computing devices or other devices not shown.

Source system 110 and destination system 130 each may be a laptop computer, tablet computer, netbook computer, personal computer (PC), a desktop computer, minicomputer mainframe computer or any programmable electronic device capable of supporting virtualized computing. Source system 110 and destination system 130 can communicate with each other, HMC 160, and other computing devices (not shown) via network 170. Source system 110 and destination system 130 may also include internal and external hardware components, as depicted and described in further detail with respect to FIG. 6.

LPARs (e.g., 112-1 to 112-*n* and 132-1 to 132-*n*) are logical partitions of a computer (e.g. source system 110 and destination system 130) with each partition appearing to have its own processors, memory, and storage. Each LPAR can be operated independently running its own operating system and applications. In some embodiments, LPARs (e.g., 112-1 to 112-*n* and 132-1 to 132-*n*) may be configured as an AIX® server, a LINUX® server, a Virtual I/O server, or the like. In other embodiments, LPARs (e.g., 112-1 to 112-*n* and 132-1 to 132-*n*) contain a database server, a file server, a mail server, a print server, a web server, a gaming server, or an application server. In embodiments of the invention, there may be any number (e.g., greater or fewer than depicted in FIG. 1) of LPARs 112-1 to 112-*n* and LPARs 132-1 to 132-*n*.

Memory areas (e.g., 122-1 to 122-*n* and 142-1 to 142-*n*) are logical memory mappings maintained by a hypervisor (e.g., hypervisors 120 and 140). Source system 110 allows an LPAR (e.g., LPAR 112-1) use of a portion of physical memory corresponding to source system 110. LPAR 112-1 will have a unique memory area (e.g., memory area 122-1) which LPAR 112-1 references to access memory. In general, memory area 122-1 is a logical memory map, maintained by hypervisor 120, which identifies the physical location of memory owned and used by LPAR 112-1, in accordance with embodiments of the invention. In embodiments of the invention, there may be any number (e.g., greater or fewer than depicted in FIG. 1) of memory areas 122-1 to 122-*n* and memory areas 142-1 to 142-*n*.

HMC 160 may be a laptop computer, tablet computer, netbook computer, personal computer (PC), a desktop computer, or any programmable electronic device capable of communicating with source system 110 and destination system 130 via network 170. In general, HMC 160 represents any programmable electronic device or combination of programmable electronic devices capable of executing machine readable program instructions and communicating with other computing devices, such as source system 110, destination system 130, and other computing devices (not shown) via a network, such as network 170. HMC 160 may also include internal and external hardware components, as depicted and described in further detail with respect to FIG. 6.

In one embodiment, one or more managed systems, such as source system 110 and destination system 130, comprise LPARs (e.g. 112-1 to 112-*n* and 132-1 to 132-*n*) and hypervisors 120 and 140. Hypervisors 120 and 140 may be computer software, firmware, or hardware that creates and runs virtual machines, such as LPARs 112-1 to 112-*n* and 132-1 to 132-*n*. In some embodiment, hypervisor 120 allows multiple operating systems to share a single hardware host (such as source system 110). In other embodiments, hypervisor 120 controls the processor and resources allocated to each virtual system (e.g., 112-1 to 112-*n*) making sure the virtual systems cannot disrupt each other.

Hypervisors 120 and 140 may also comprise mover services 124 and 144, and one or more memory areas (e.g., 122-1 to 122-*n* and 142-1 to 142-*n*). Mover services 124 and 144 may each be a program corresponding to an LPM operation. In the depicted example, LPAR 112-2 and memory area 122-2 (of source system 110) are to be migrated to LPAR 132-2 and memory area 142-2 (of destination system 130). Mover service 124 on source system 110 sends memory pages corresponding to memory area 122-2 to mover service 144 on destination system 130, and mover service 144 places the received memory pages in memory area 142-2. Mover service 124 transmits the memory pages to mover service 144 over network 170.

The embodiments disclosed herein may be leveraged by managed systems 110 and 130 in order to facilitate improved performance during migration of active LPAR 112-2 between managed systems 110 and 130 using a generated list that identifies the order in which memory pages are to be moved.

Figure 2:
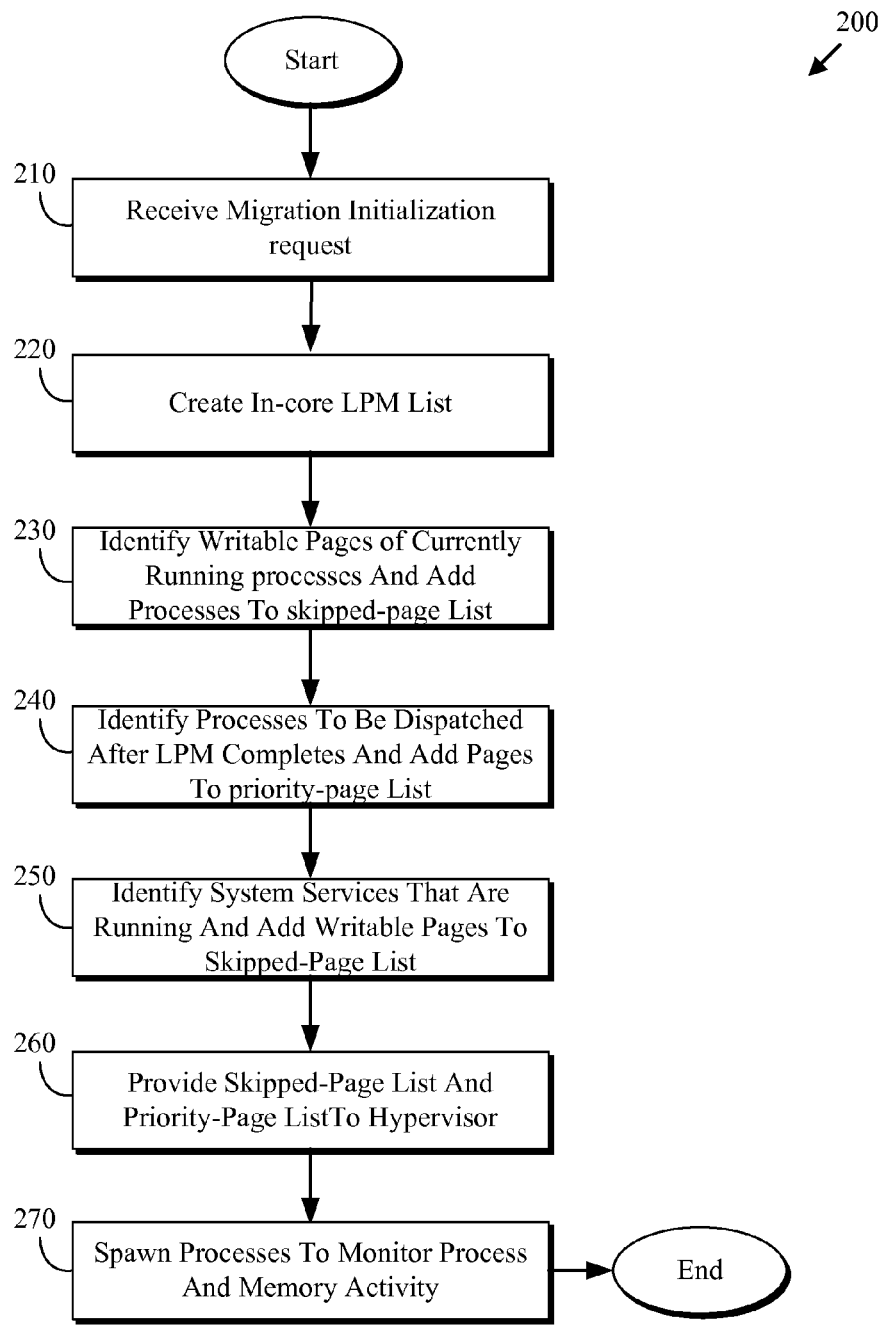
FIG. 2 is a flowchart depicting a method for memory page analysis, in accordance with an embodiment of the present invention.

FIG. 2 is a flowchart depicting a method for memory page analysis, in accordance with an embodiment of the present invention. As depicted, memory page analysis method 200 includes receiving (210) a migration initialization request, creating (220) an in-core LPM list, identifying (230) writable memory pages, identifying (240) processes scheduled to be dispatched after LPM completion, identifying (250) system services that are running, providing (260) the skipped-page list and priority-page list to a hypervisor, and spawning (270) processes to monitor process and memory activity. Memory page analysis method 200 enables system migration via LPM using ordered memory migration on source system 110.

Receiving (210) a migration initialization request may include source system 110 receiving, from HMC 160, a request to initiate an LPM migration for LPAR 112-2 and corresponding memory area 122-2. Initiating a migration may include starting an LPM migration process (e.g., a daemon) such as migration process 118 on LPAR 112-2. Initiating a migration may also include starting mover service 124 on hypervisor 120. Additionally, HMC 160 may supply, to both migration process 118 and mover service 124, the identity of a destination system (e.g., destination system 130). Migration process 118 may identify LPAR 132-2 and memory area 142-2 on destination system 130 as the target of the LPM migration process. Mover service 124 may communicate with mover service 144 on destination system 130, enabling LPAR 112-2 and memory area 122-2 to be copied to LPAR 132-2 and memory area 142-2.

Creating (220) an in-core LPM list may include LPM migration process 118 creating a list that contains page identifiers corresponding to memory pages currently present in a memory area 122-2 corresponding to LPAR 112-2. In some embodiments, LPM migration process 118 sorts the memory pages identified in the in-core LPM according to a predetermined transfer order, producing an ordered in-core LPM list. Memory pages designated as read-only pages cannot be updated, and therefore cannot become dirty if moved. In one embodiment, the transfer order of the memory pages (from highest to lowest priority) is identified as read-only pages, pinned pages, working storage pages, shared pages, file cache pages, and direct memory access (DMA) pages. Those of skill in the art will appreciate that there may be other logical ordering alternatives that may be used to produce an ordered in-core LPM list. LPM migration process 118 may provide the ordered LPM list to hypervisor 120, enabling hypervisor 120 to begin transferring memory pages from source system 110 to destination system 130 according to the ordered in-core LPM list.

Additionally, LPM migration process 118 may also create a skipped-page list and a priority-page list. A skipped-page list may be used to contain page identifiers of memory pages that should not be immediately copied to destination system 130. The priority-page list may be used to contain page identifiers of memory pages that can be immediately copied to destination system 130 with minimal probability of the pages becoming dirty during the migration operation. In some embodiments, LPM migration process 118 uses the contents of the skipped-page list and priority-page list may to alter (e.g., reorder) the contents and order of in-core LPM list.

Identifying (230) writable memory pages may include LPM migration process 118 using system commands familiar to one of skill in the art to identifying writable memory pages of currently running processes corresponding to LPAR 112-2. Active processes that own writeable memory pages continuously update the writable memory pages. If the writable memory pages are copied to destination system 130, the writeable memory pages may become dirty. To prevent copying dirty memory pages to destination system 130, LPM migration process 118 may add page identifiers corresponding to writable memory pages of currently running processes to the skipped-page list.

Identifying (240) processes scheduled to be dispatched after LPM completion may include LPM migration process 118 using system commands familiar to one of skill in the art to identify processes corresponding to LPAR 112-2 that are currently inactive, and scheduled to be dispatched (i.e., start running) after the estimated completion of the LPM migration. A process scheduled to be dispatched after the completion of the LPM migration will execute on destination system 130 only. The identified process will not execute source system 110, therefore, memory pages in memory area 122-2 corresponding to the identified process will not be updated (i.e., will not become dirty) and can be migrated. In some embodiments, LPM migration process 118 adds page identifiers, of memory pages corresponding to the identified process, to the priority list.

Identifying (250) system services that are running may include LPM migration process 118 using system commands familiar to one of skill in the art to identify system services and long running processes executing in an LPAR, for example, LPAR 112-2. System services may include, but are not limited to, system tuning processes, system tracing processes, system accounting processes, performance monitoring processes, and LPM migration processes. In some embodiments, LPM migration process 118 adds page identifiers, of writable memory pages corresponding to the system services and long running processes, to the skipped-page list.

Providing (260) the skipped-page list and priority-page list to a hypervisor may include LPM migration process 118 updating (e.g., reordering) the in-core LPM list with the contents of the skipped-page list and priority-page list. In some embodiments, LPM migration process 118 produces an modified in-core LPM list by removing page identifiers of pages identified in the skipped-page list from the copy of the in-core LPM list and moving memory pages identified in the priority-page list to the top (e.g., highest priority) of the copy of the in-core LPM list. LPM migration process 118 may provide the modified in-core LPM list to hypervisor 120. In other embodiments, LPM migration process 118 provides the skipped-page list and priority-page list to hypervisor 120, and hypervisor 120 modifies the current copy of the in-core LPM list using the contents of the skipped-page list and priority-page lists, producing a modified in-core LPM list.

It should be noted that the in-core LPM list may be updated with the contents of the skipped-page list and the priority-page list many times during a migration operation. In some embodiments, LPM migration process 118 updates the in-core LPM list with the contents of the skipped-page list and the priority-page list immediately after the skipped-page list or the priority-page list is updated. In other embodiments, LPM migration process 118 updates the in-core LPM list with the contents of the skipped-page list and the priority-page list at predetermined intervals in the LPM migration process.

Spawning (270) monitoring processes to monitor LPAR process and memory activity may include LPM migration process 118 invoking one or more programs on source system 110. In some embodiments, the one or more programs execute as daemons running as background processes in an LPAR (e.g., LPAR 112-2). The monitoring processes may monitor process and memory activity on an LPAR (e.g., LPAR 112-2) and memory area (e.g., memory area 122-2). The monitoring processes may be used to monitor exiting (e.g., terminating) processes, monitor processes waiting for an event to occur, monitor memory utilization, and the like. The monitoring processes may update the skipped-page list or the priority-page list, providing additional order and greater detail to the LPM migration. The monitoring processes may continue to execute as a background process as long as the pre-migration phase of an LPM migration is active. Once the LPM pre-migration process becomes inactive, all monitoring processes corresponding to the LPM migration may be terminated. A more detailed description of possible monitoring processes is provided in FIGS. 3-5.

Figure 3:
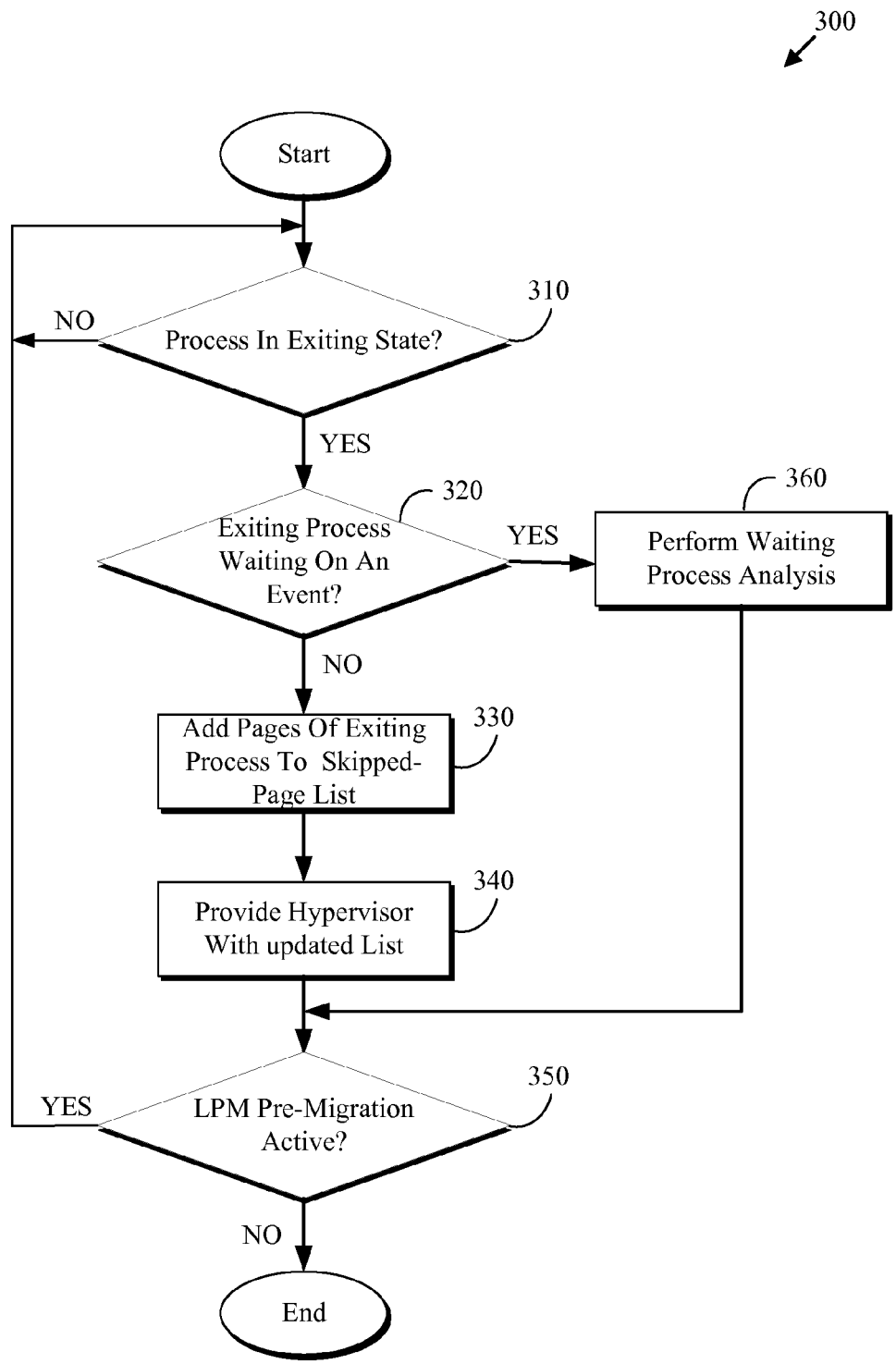
FIG. 3 is a flowchart depicting a method for detecting active processes that have indicated they are about to exit (i.e., terminate execution), in accordance with an embodiment of the present invention.

FIG. 3 is a flowchart depicting an example of a possible program (or daemon) that could be started as a result of the method depicted in FIG. 2 (see step 270). The example program detects active processes that have indicated they are about to exit (i.e., terminate execution), in accordance with an embodiment of the present invention. As depicted, process exit tracker method 300 includes determining (310) whether a process is exiting, determining (320) whether a process is waiting on an event, adding (330) pages to the skipped-page list, providing (340) the skipped-page list to a hypervisor, determining (350) whether LPM pre-migration phase is active, and performing (360) waiting process analysis. Process exit tracker method 300 enables memory page analysis method 200 to detect processes that may exit prior to the completion of an LPM system migration. Exit tracker method 300 may be carried out by an exit detection operation.

Determining (310) whether a process is exiting may include the exit detection operation monitoring a process exit flag, and detecting when a process is in an exit state (i.e., planning to exit). The exit flag may be set in advance of the actual exit of the process. If the exit detection operation detects that a process is in exit state (i.e., the process exit flag corresponding to the process is turned on), then the exit detection operation proceeds to determining (320) whether the process is waiting on an event. Otherwise, the exit detection operation proceeds to determining (350) whether the migration is complete.

Determining (320) whether a process is waiting on an event may include the exit detection operation verifying if the process is currently in a wait state. A process in wait state may be waiting for an event to occur before the process can exit. If the exit detection operation detects that a process is waiting on an event, then the exit detection operation proceeds to performing (360) waiting process analysis. Otherwise, the exit detection operation proceeds to adding (330) pages to the skipped-page list.

Adding (330) pages to the skipped-page list may include the exit detection operation retrieving page identifiers of pages corresponding to a process that may exit prior to completion of an LPM system migration. The exit detection operation may add the retrieved page identifiers to the skipped-page list. In some embodiments, a process exits (e.g., terminates) if the process runs to completion. In other embodiments, a process terminates if the process encounters an error situation which results in an abnormal termination. The page identifiers of any memory pages corresponding to a process that may terminate prior to completion of an LPM system migration may be added to the skipped-page list.

Providing (340) the skipped-page list to a hypervisor may include the exit detection operation updating the in-core LPM list used by the hypervisor (e.g., hypervisor 120). Updating the in-core LPM list may include removing from the in-core LPM list any pages identified in the skipped-page list. In some embodiments, the skipped-page list is provided to hypervisor 120, and hypervisor 120 modifies the current copy of the in-core LPM list using the contents of the skipped-page list, producing a modified in-core LPM list. In other embodiments, the memory pages identified in the skipped-page list are removed from a copy of the in-core LPM list and the modified in-core LPM list is provided to hypervisor 120.

Determining (350) whether LPM pre-migration phase is active may include the exit detection operation confirming that hypervisor 120 is actively copying memory pages from a source system (e.g., source system 110) to a destination system (e.g., destination system 130). In some embodiments, the LPM pre-migration phase completes (i.e. becomes inactive) when a predefined percentage of the pages have been successfully copied to destination system 130. In other embodiments, the LPM pre-migration phase becomes inactive when the LPM migration times out and terminates. If the exit detection operation detects that the LPM pre-migration is active, then the exit detection operation continues monitoring for processes in an exit state and proceeds to determining (310) whether a process is exiting. Otherwise, the exit detection operation terminates.

Performing 360 waiting process analysis may include the exit detection operation determining what event must occur for the waiting process to complete the exit (e.g., termination) process. Waiting process analysis may be performed by waiting process tracker method 400. The waiting process analysis operation will be described in greater detail in the description of FIG. 4.

Figure 4:
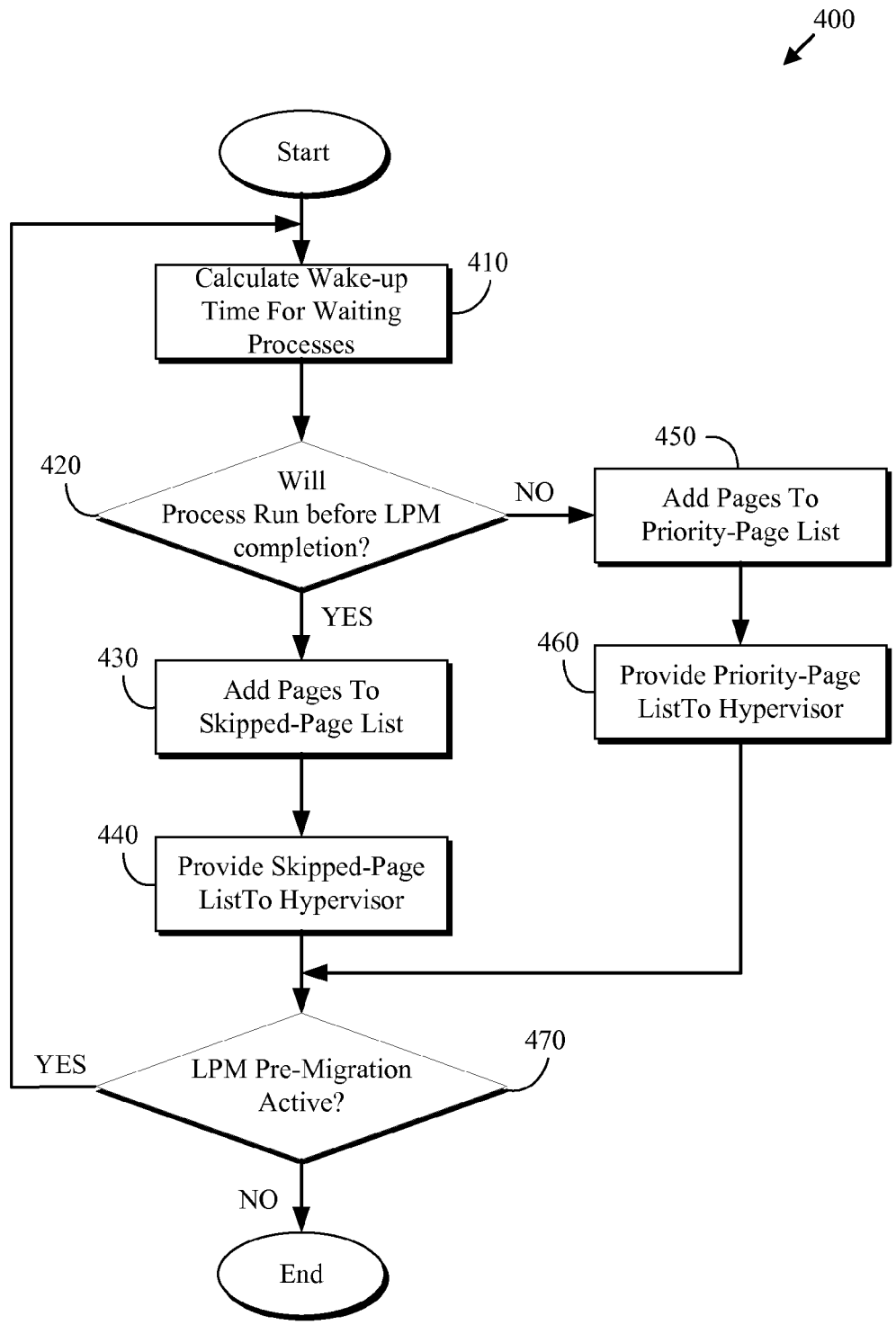
FIG. 4 is a flowchart depicting a method for detecting inactive processes that are waiting for the completion of some event before resuming activity, in accordance with an embodiment of the present invention.

FIG. 4 is a flowchart depicting an example of a possible program (or daemon) that could be started as a result of the method depicted in FIG. 2 (see step 270). The example program detects inactive processes that are waiting for the completion of some event before the waiting process can resuming activity, in accordance with an embodiment of the present invention. As depicted, waiting process tracker method 400 includes calculating (410) a wake-up time, determining (420) whether a process will run prior to LPM completion, adding (430) pages to the skipped-page list, providing (440) the skipped-page list to the hypervisor, adding (450) pages to the priority-page list, providing (460) priority-page list to the hypervisor, and determining (470) whether LPM pre-migration phase is active. Waiting process tracker method 400 enables memory page analysis method 200 to detect inactive processes (e.g., processes in a wait state) that may not become active prior to the completion of the LPM system migration. Waiting process tracker method 400 may be carried out by a wait state detection operation.

Calculating (410) a wake-up time may include the wait state detection operation determining a time when the event on which a process is waiting is expected to complete, and the expected completion time may be determined to be the calculated wake-up time. In some embodiments, the wait state detection operation uses historical data corresponding to the completion time of the waited upon event to calculate a wake-up time. In other embodiments the waiting process is waiting for a scheduled event that will not occur until after the LPM migration has completed, and therefore the waiting process will not complete until after the LPM migration has completed.

Determining (420) whether a process will run prior to LPM completion may include the wait state detection operation comparing a calculated wake-up time with the calculated LPM completion time (e.g., the LPM completion time determined in initializing (210) a migration operation of FIG. 2). If the wait state detection operation determines the calculated wake-up time is prior to the calculated LPM completion time, then the wait state detection operation proceeds to adding (430) pages to the skipped-page list. Otherwise the wait state detection operation proceeds to adding (450) pages to the priority-page list.

Adding (430) pages to the skipped-page list may include the wait state detection operation continuing to process a waiting process (i.e., processes in wait state) that may move out of wait state and execute prior to the completion of an LPM system migration. The page identifiers of any memory pages corresponding to a waiting process that may begin execution prior to completion of a LPM system migration may be added to the skipped-page list.

Providing (440) the skipped-page list to the hypervisor may include the wait state detection operation updating the in-core LPM list used by the hypervisor (e.g., hypervisor 120). Updating the in-core LPM list may include removing from the in-core LPM list any pages identified in the skipped-page list. In some embodiments, the skipped-page list is provided to hypervisor 120, and hypervisor 120 modifies the current copy of the in-core LPM list using the contents of the skipped-page list, producing a modified in-core LPM list. In other embodiments, the memory pages identified in the skipped-page list are removed from a copy of the in-core LPM list and the modified in-core LPM list is provided to hypervisor 120.

Adding (450) pages to the priority-page list may include the wait state detection operation continuing to process a waiting processes (i.e., processes in wait state) that may not move out of wait state prior to the completion of a LPM system migration. The page identifiers of any memory pages corresponding to a waiting process that may not execute prior to the completion of a LPM system migration may be added to the priority-page list.

Providing (460) priority-page list to the hypervisor may include the wait state detection operation updating the in-core LPM list used by the hypervisor (e.g., hypervisor 120). In some embodiments, the priority-page list is provided to hypervisor 120, and hypervisor 120 modifies the current copy of the in-core LPM list using the contents of the priority-page list, producing a modified in-core LPM list. In other embodiments, the memory pages identified in the priority-page list are moved to the top (e.g., highest priority) of a copy of the in-core LPM list, and the modified in-core LPM list is provided to hypervisor 120.

Determining (470) whether LPM pre-migration phase is active may include the wait state detection operation confirming that hypervisor 120 is actively copying memory pages from a source system (e.g., source system 110) to a destination system (e.g., destination system 130). In some embodiments, the LPM pre-migration phase completes (i.e. becomes inactive) when a predefined percentage of the pages have been successfully copied to destination system 130. In other embodiments, the LPM pre-migration phase becomes inactive when the LPM migration times out and terminates. If the wait state detection operation detects that the LPM pre-migration is active, then the wait state detection operation continues to monitor for processes in a wait state and proceeds to calculating (410) a wake-up time. Otherwise, the wait state detection operation terminates.

Figure 5:
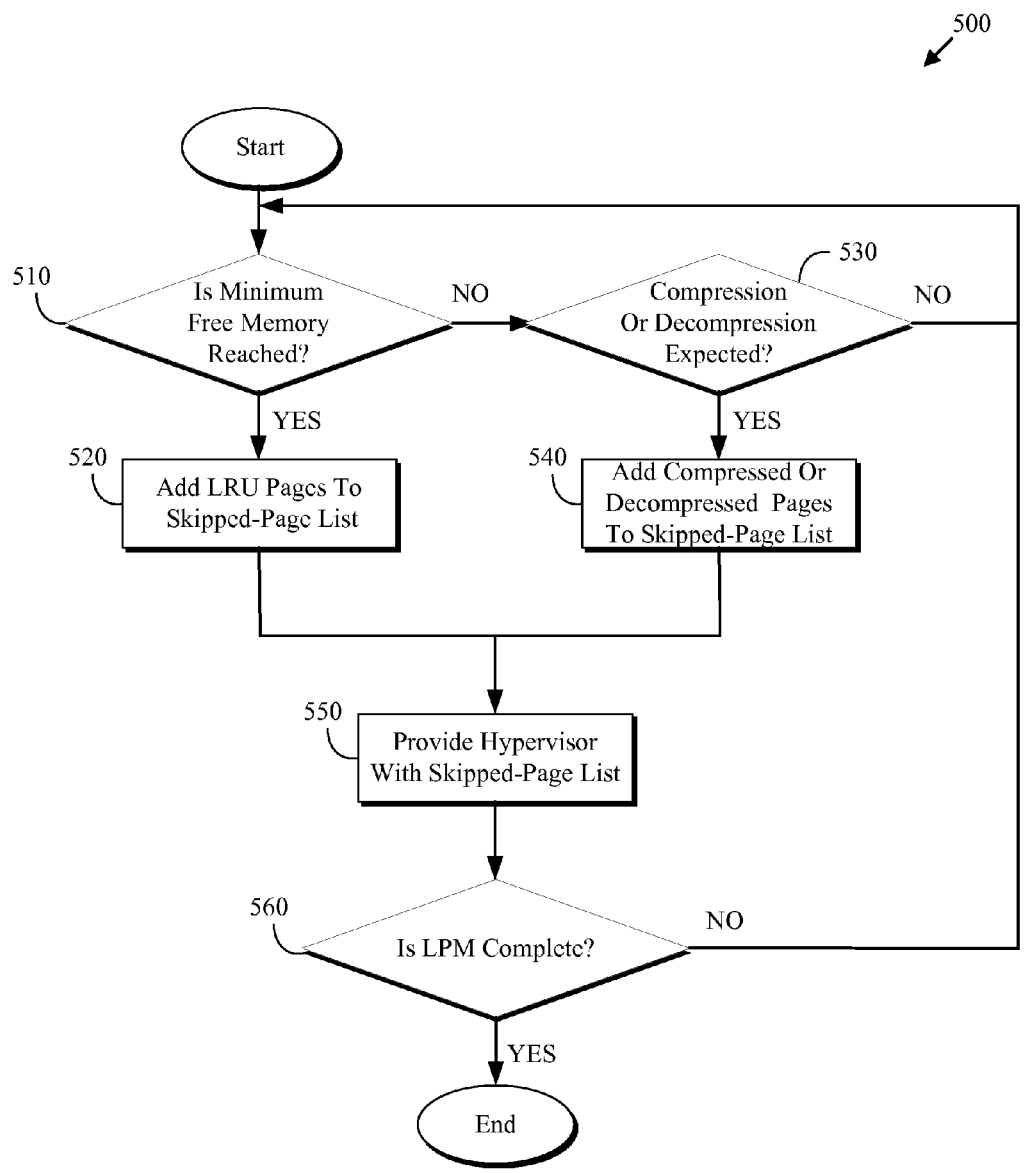
FIG. 5 is a flowchart depicting a method for detecting memory pages that may be paged out of memory prior to migration completion, in accordance with an embodiment of the present invention.

FIG. 5 is a flowchart an example of a possible program (or daemon) that could be started as a result of the method depicted in FIG. 2 (see step 270). The example program detects memory pages that may be paged out of memory prior to migration completion, in accordance with an embodiment of the present invention. As depicted, memory tracker method 500 includes determining (510) whether a minimum free memory threshold has been reached, adding (520) least recently used (LRU) pages to the skipped-page list, determining (530) whether page compression or decompression is expected, adding (540) pages to the skipped-page list, providing (550) the skipped-page list to hypervisor 120, and determining (560) whether LPM pre-migration phase is active. Memory utilization process tracker method 500 enables memory page analysis method 200 to detect memory pages that may page-out due to memory allocation requirements prior to the completion of a LPM system migration. Memory utilization process tracker method 500 may be carried out by a memory monitoring operation.

Determining (510) whether a minimum free memory threshold has been reached may include the memory monitoring operation using system commands to obtain current memory utilization statistics corresponding to the memory area that is being migrated (e.g., memory area 122-2 of FIG. 1). The minimum free memory threshold may be a predetermined limit identifying a minimum amount of free memory that is to be maintained within a computing environment. Alternatively, the minimum free memory threshold may be a system configurable limit identifying a minimum amount of free memory that is to be maintained within a computing environment. In some embodiments, the system commands corresponding to the LPAR being migrated (i.e., LPAR 112-2) return statistics including total memory, used memory, and free memory. In other embodiments, the system commands corresponding to the LPAR being migrated (i.e., LPAR 112-2) return statistics including only total memory and used memory, allowing free memory to be calculated. If a minimum free memory threshold has been reached, the memory monitoring operation proceeds to adding (520) least recently used (LRU) pages to the skipped-page list. Otherwise, the memory monitoring operation proceeds to determining (530) whether page promotion or demotion is expected.

Adding (520) least recently used (LRU) pages to the skipped-page list may include the memory monitoring operation identifying which pages of a memory area (e.g., memory area 122-2 of FIG. 1) have been least recently used. LRU or cold pages may be pages in memory that are infrequently used. Those of skill in the art will appreciate that there are many ways to identify LRU or cold memory pages. The memory monitoring operation may add page identifiers corresponding to LRU or cold pages to the skipped-page list. In some embodiments, the memory monitoring operation determines the number of pages to be added to the skipped-page list by calculating the number of pages required to bring memory utilization below the minimum free memory threshold. In other embodiments, a predetermined number of pages are repeatedly added to the skipped-page list until the minimum free memory threshold is no longer exceeded.

Determining (530) whether page compression or decompression is expected may include the memory monitoring operation determining if active memory expansion is enabled for the LPAR (i.e., LPAR 112-2) being migrated. Active memory expansion may enable pages that are infrequently used to be compressed into a smaller space in memory, and when a compressed page is referenced, it is decompressed (i.e., expanded) in memory. If the memory monitoring operation determines that page compression or decompression is expected, the memory monitoring operation proceeds to adding (540) compressed or decompressed pages to the skipped-page list. Otherwise the memory monitoring operation continues monitoring memory usage.

Adding (540) expected compressed or decompressed pages to the skipped-page list may include the memory monitoring operation placing, in the skipped-page list, page identifiers corresponding to memory pages identified as potential targets for page compression or decompression. Pages that are migrated to a destination system (e.g., destination system 130) and then are compressed or decompressed on the source system (e.g., source system 110) can result in dirty memory pages that may have to be copied to destination system 130 again.

Providing (550) the skipped-page list to hypervisor 120 may include the memory monitoring updating the in-core LPM list used by the hypervisor (e.g., hypervisor 120). Updating the in-core LPM list may include removing from the in-core LPM list any pages identified in the skipped-page list. In some embodiments, the skipped-page list is provided to hypervisor 120, and hypervisor 120 modifies the current copy of the in-core LPM list using the contents of the skipped-page list, producing a modified in-core LPM list. In other embodiments, the memory pages identified in the skipped-page list are removed from a copy of the in-core LPM list and the modified in-core LPM list is provided to hypervisor 120.

Determining (560) whether LPM pre-migration phase is active may include the memory monitoring operation confirming that hypervisor 120 is actively copying memory pages from a source system (e.g., source system 110) to a destination system (e.g., destination system 130). In some embodiments, the LPM pre-migration phase completes (i.e. becomes inactive) when a predefined percentage of the pages have been successfully copied to the destination system 130. In other embodiments, the LPM pre-migration phase becomes inactive when the LPM migration times out and terminates. If the memory monitoring operation detects that the LPM pre-migration is active, then the memory monitoring operation continues to monitor memory utilization and proceeds to determining (510) whether a minimum free memory threshold has been reached. Otherwise, the memory monitoring operation terminates.

Figure 6:
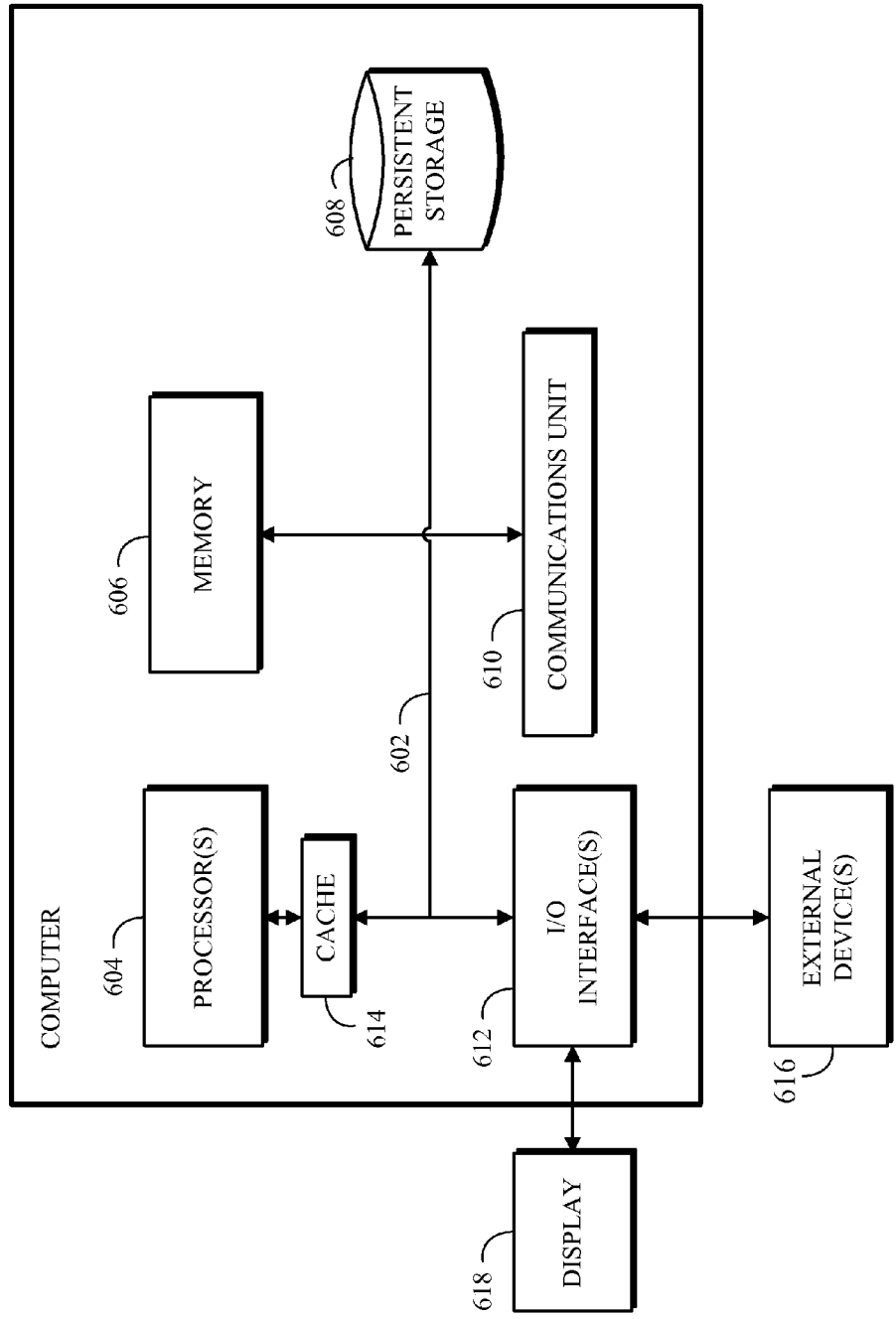
FIG. 6 is a block diagram depicting various components of one embodiment of a computer suitable for executing the methods disclosed herein.

FIG. 6 depicts a block diagram of components of a computer system 600, which is an example of a system such as source system 110, destination system 130, and HMC 160 within virtualized computing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Source system 110, destination system 130, and HMC 160 each include processor(s) 604, cache 614, memory 606, persistent storage 608, communications unit 610, input/output (I/O) interface(s) 612 and communications fabric 602. Communications fabric 602 provides communications between cache 614, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 614 is a fast memory that enhances the performance of processor(s) 604 by holding recently accessed data, and data near recently accessed data, from memory 606.

Program instructions and data used to practice embodiments of the present invention, e.g., memory page analysis method 200, are stored in persistent storage 608 for execution and/or access by one or more of the respective processor(s) 604 via cache 614. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of source system 110, destination system 130, and HMC 160. In these examples, communications unit 610 includes one or more network interface cards. Communications unit 610 may provide communications through the use of either or both physical and wireless communications links. Program instructions and data used to practice embodiments of memory page analysis method 200 may be downloaded to persistent storage 608 through communications unit 610.

I/O interface(s) 612 allows for input and output of data with other devices that may be connected to each computer system. For example, I/O interface(s) 612 may provide a connection to external device(s) 616 such as a keyboard, a keypad, a touch screen, a microphone, a digital camera, and/or some other suitable input device. External device(s) 616 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 618.

Display 618 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for enabling live partition mobility using ordered memory migration, the method comprising:
   receiving a request to initialize a migration of a logical partition (LPAR) to a destination system;
   creating, by one or more processors, a list, wherein the list comprises one or more memory page identifiers corresponding to memory pages of the LPAR, wherein the one or more memory page identifiers of the list are ordered according to a page transfer priority;
   identifying, by one or more processors, memory pages of the LPAR, wherein the memory pages are unmodified during an estimated duration of time of the migration;
   updating, by one or more processors, the list, based on, at least, the identified memory pages of the LPAR; and
   migrating, by one or more processors, the LPAR based on, at least, the list.

2. The method of claim 1, wherein identifying the memory pages of the LPAR comprises:
   identifying, by one or more processors, memory pages corresponding to a process scheduled to dispatch after an estimated completion time of the migration; and
   identifying memory pages designated as read-only.

3. The method of claim 1, further comprising:
   identifying, by one or more processors, writeable memory pages corresponding to a currently running process of the LPAR; and
   wherein updating the list is further based on the identified writeable memory pages corresponding to the currently running process of the LPAR.

4. The method of claim 3, wherein updating the list comprises:
   reordering, by one or more processors, the list such that memory page identifiers corresponding to the identified memory pages corresponding to the currently running process of the LPAR follow other memory page identifiers of the list.

5. The method of claim 1, wherein updating the list comprises:

reordering, by one or more processors, the list such that memory page identifiers corresponding to the identified memory pages of the LPAR precede other memory page identifiers of the list.

6. The method of claim 1, further comprising:

identifying, by one or more processors, memory pages expected to be compressed during the estimated duration of time of the migration, based on, at least, infrequency of use of the memory pages; and wherein updating the list is further based on the identified memory pages expected to be compressed during the estimated duration of time of the migration.

7. The method of claim 1, wherein the page transfer priority includes, at least, an ordered identification of read-only pages, pinned pages, working storage pages, shared pages, file cache pages, and direct memory access pages.

* * * * *